United States Patent [19]

Chaibongsai

[11] 4,355,604
[45] Oct. 26, 1982

[54] SHROUDED VALVE FOR INTERNAL COMBUSTION ENGINE

[76] Inventor: Sampao Chaibongsai, 33278 Linsdale Ct., Sterling Heights, Mich. 48077

[21] Appl. No.: 153,039

[22] Filed: May 27, 1980

[51] Int. Cl.³ .............................................. F01L 3/06
[52] U.S. Cl. ..................... 123/188 VA; 123/188 AF; 123/306
[58] Field of Search ..... 123/188 R, 188 VA, 188 AF, 123/306

[56]     References Cited
U.S. PATENT DOCUMENTS

| | | | |
|---|---|---|---|
| 1,471,955 | 10/1923 | Grieve | 123/188 VA |
| 1,624,850 | 4/1927 | Steele | 123/188 VA |
| 2,740,392 | 4/1956 | Hollingsworth | 123/188 VA |
| 3,757,757 | 9/1973 | Bastenhof | 123/188 VA |

FOREIGN PATENT DOCUMENTS 2622546  12/1976  Fed. Rep. of Germany ...... 123/188 AF Primary Examiner—Craig R. Feinberg
Assistant Examiner—W. R. Wolfe Attorney, Agent, or Firm—Cullen, Sloman, Cantor, Grauer, Scott & Rutherford

[57] ABSTRACT

A 360° shrouded intake valve for use with an internal combustion engine having an intake valve located between a charge induction passage and a combustion chamber of the engine. The shroud is in the form of a collar secured to the intake valve face intermediate the valve stem and valve head portions. The shroud is formed with a plurality of ports extending therethrough to provide a controlled flow field of the air-fuel mixture charge in the combustion chamber during the induction stroke of the intake valve. Thus, the charge enters the combustion chamber divided into a plurality of jet-like flows to create turbulence inside the combustion chamber thereby increasing the flame speed and the combustion rate and shortening the duration of the flame propagation during the combustion process yielding less cycle-to-cycle variation. As a result, a more rapid and complete combustion of the charge is achieved upon ignition for improving the engine thermal efficiency. Furthermore a leaner air-fuel mixture may be used and there is a reduction in the amount of pollutant.

16 Claims, 4 Drawing Figures

U.S. Patent  Oct. 26, 1982  4,355,604

SHROUDED VALVE FOR INTERNAL COMBUSTION ENGINE

BACKGROUND OF THE INVENTION

The present invention relates to intake valves for internal combustion engines and more particularly to a shroud for the intake valve that initiates controlled turbulence of the combustion charge during the intake stroke.

The advantages of providing intense turbulence during selected combustion phases of a spark ignition engine have long been recognized as a means of increasing the rate of combustion or flame propagation.

In a spark ignition engine, both turbulence and swirl are created at the intake stroke. As a result, the intake stroke is one key to controlling the combustion process inside the combustion chamber of the engine. Prior art attempts to increase turbulence in internal combustion engines include using different inlet port designs, separating the various combustion phases and the use of deflector plates, as illustrated for example in U.S. Pat. No. 3,757,757 to Bastenhof, and in the case of Diesel engines, the use of deflector plates on the inlet valves, the effect of which has been to increase the swirling motion and incidentally, the turbulence intensity of the oil spray charge, when introduced directly into the cylinder burning chamber.

The main effect of swirl on the combustion process, however, is to change the flame front in the combustion chamber from being symmetrical about the spark plug and in so doing, to increase the flame front area resulting in faster flame propagation.

The present invention also solves the problem of improving thermal efficiency and reducing pollutants. Specifically, it is known that the typical pollutants are hydrocarbons (HC), carbon monoxide (CO), and the nitrogen-oxygen combinations generally referred to as $NO_x$.

SUMMARY OF THE INVENTION

The present invention provides improved turbulence and/or swirl within the combustion chamber. This provides several benefits. First, flame speed is increased. Second, the combustion rate is increased. Third the flame propagation duration is shortened resulting in less cycle-to-cycle variation so the engine runs more smoothly. Fourth, there is more complete combustion which reduces the amount of HC and CO pollutants. Fifth, a leaner air-fuel mixture may be used resulting in a lower combustion temperature which reduces the amount of $NO_x$ pollutants.

Thus the present invention provides a perforated shrouding structure for the intake valve of a spark ignition internal combustion engine to create turbulence and/or swirl during the intake period so that a maximum rate of combustion or burning velocity of the charge can be obtained during the combustion phase. The resultant increased burning velocity or flame speed achieves a reduction in flame duration time, minimizing cycle-to-cycle variation yielding smoother engine operation. Further, a leaner air-fuel ratio of the charge is possible without mis-firing or surging by providing almost complete combustion with minimum unburned fuel and lower combustion temperature resulting in less pollutants while providing a more efficient combustion process. In addition to these effects, a leaner air-fuel mixture reduces engine knock. Therefore, with the perforated shrouded valve of the present invention, the engine may be run at higher compression ratios and/or with lower octane rating fuel.

The present invention provides a novel shroud design for an intake valve that achieves high turbulence intensity during the intake stroke. A 360° circular shroud is provided having centrally located bore means for establishing sealing contact with the intake valve at a location intermediate the valve stem portion and the valve head portion. The shroud has a plurality of port means extending therethrough adapted to divide the intake charge into a plurality of jet-like flows. In the preferred embodiment, radially disposed ports direct the flow into the combustion chamber creating turbulence intensity whereby upon ignition of the charge rapid and complete combustion is achieved.

It is thereby an object of the present invention to provide an improved shroud arrangement for an intake valve of a spark ignition engine wherein turbulence is created during the charge induction stroke of the engine.

It is another object of the present invention to provide effective turbulence and/or swirl inside the combustion chamber of an internal combustion engine in order to obtain a higher thermal efficiency and to reduce the pollutants. The turbulence and/or swirl is promoted by a 360° shrouded intake valve having a plurality of port means extending through the shroud for dividing a portion of the charge flow from the induction chamber into a plurality of jet-like flows entering the combustion chamber such that turbulence of the flow field of the charge is promoted to provide rapid and complete combustion of the charge upon its ignition.

DESCRIPTION OF THE DRAWINGS

The various features, objects and benefits of the present invention will be more completely appreciated upon reading the detailed description of the invention in connection with the drawings. In the drawings.

DESCRIPTION OF THE PREFERRED EMBODIMENT

Figure 1:
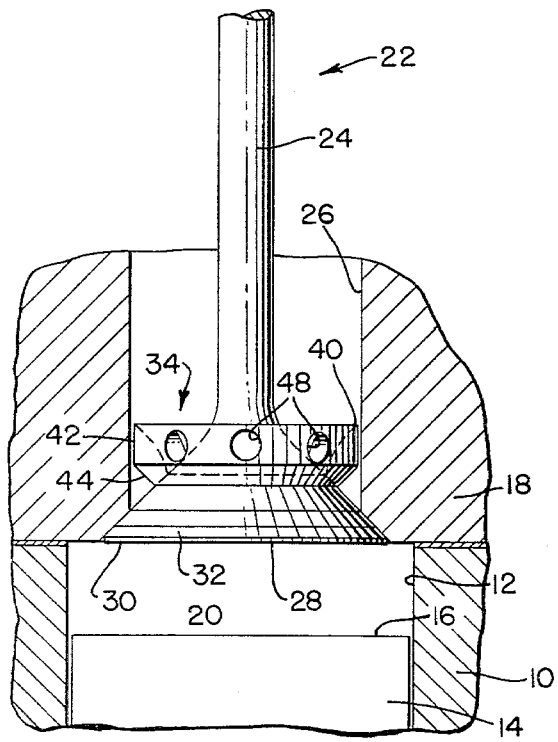
FIG. 1 is a fragmentary cross-sectional view of a portion of one cylinder of an engine illustrating in elevation an intake valve in its raised or closed position including a preferred embodiment of a valve shroud.

Referring to FIG. 1, part of a spark ignition internal combustion engine is illustrated and includes an engine block 10 formed with a cylinder bore 12 slidably receiving a conventional reciprocating piston 14 having an upper surface 16. A cylinder head 18 is located above the block 10 and closes the bore. Thus, the block, together with upper surface of the piston, defines a combustion chamber 20.

An intake poppet valve, generally indicated at 22, is provided for the combustion chamber 20 and includes a valve stem portion 24 disposed in conventional valve guide means (not shown) for reciprocal movement in a passage 26 within the block 10. The valve head portion 28, including a valve margin 30, is interconnected by a frusto-conical face portion 32, often referred to as the valve neck, to the valve stem 24. Spark ignition means in the form of conventional spark plug (not shown) is provided for igniting the combustible charge in chamber 20 upon the charge entering the chamber from induction passage 26.

According to the principles of the present invention the valve 22 includes a shroud 34 in the form of a circular or 360° collar having a centrally located hollow bore 36 defining a lower annular shroud edge 38 and an upper annular shroud edge 40.

The interior surface of the lower annular shroud surface portion 38 is frusto-conical in shape converging the valve to abut against face portion 32 for establishing a sealing contact. In the present form of the invention, the shroud 34 is suitably secured by welding to the valve face. The bore is of non-uniform diameter from the shroud top to the shroud bottom and decreases from a maximum diameter at the upper shroud edge 40 to a minimum diameter where the shroud abuts against the valve face 32. Thereafter the bore diameter increases to the shroud lower edge 38.

The shroud 34 includes an outer cylindrical wall 42 terminating at its lower end in a beveled portion 44. The cylindrical wall portion 40 is machined to a diameter slightly less than the internal diameter of the circular induction passage 26. The shroud is thus sized to permit its reciprocal sliding movement within the passage 26 when the poppet valve 22 is in its raised or closed position. It will be noted that with the valve on its upper or closed position, the valve face 32 seats in a sealed manner against a conforming conical valve seat 46 formed at the lower end of the valve passage 26 as is well-known.

Figure 2:
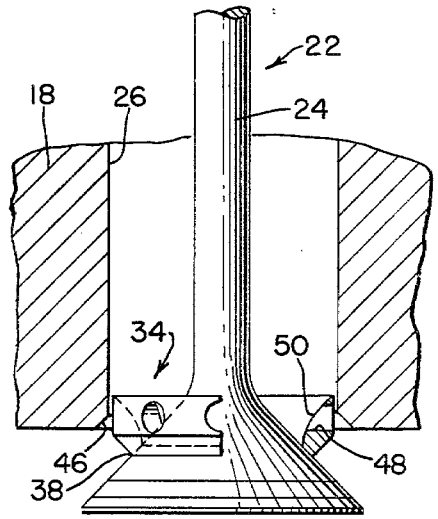
FIG. 2 is a view similar to FIG. 1 showing the intake valve of FIG. 1 in an open position, with a portion of the valve shroud broken away to show details thereof.

As best seen in FIG. 2, the shroud 34 has a plurality of port means extending therethrough in the form of circular ports 48 arranged such that the ports extend radially with each port axis located in the same plane. The plane of the port axes is perpendicular to the longitudinal axis of the valve. The ports are centered relative to the top and bottom of the straight section of the shroud outer wall 42.

In the preferred form of the invention, the outer diameter of the circular shroud is about 2.94 centimeters. The shroud has a minimum inside diameter, measured where the shroud abuts against the valve face 32, of about 2.324 centimeters. The diameter of the valve margin 30 is about 3.429 centimeters. The interior height of the shroud, from the upper surface 40 to where the shroud abuts against the valve face 32, is about 7.366 mm.

In the preferred embodiment of the invention a total of eight ports 48 are provided in the shroud with each port having a diameter of about 6 millimeters. The eight parts are uniformly spaced around the circumference of the shroud in a single row, with the edge-to-edge distance between adjacent ports being of the order of 3.125 millimeters, and with the axes of adjacent ports intersecting at a 45° angle.

Figure 3:
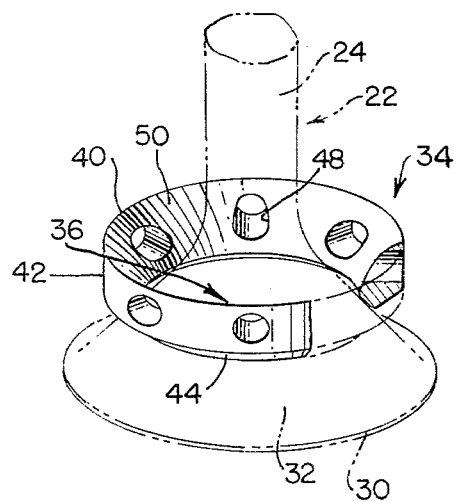
FIG. 3 is a perspective view of the valve and shroud of FIGS. 1 and 2 with the intake valve shown in phantom.

As best seen in FIG. 3, the non-uniform inside diameter of the shroud results in an inside shroud surface 50 from the upper shroud edge 40 to where the shroud abuts the valve face 32 which inside surface 50 is formed as a convex air foil-like surface. The function of the air foil-like surface portion 50 is to reduce friction loss of the flow of the charge from the valve passage 26 into the inner inlet of each of the circular ports 48.

According to the principles of the present invention all of the flow into the combustion chamber 20 must be through the ports 48. Thus when the valve is at its fully open or lowermost position, as illustrated in FIG. 2, the top edge 40 of the shroud must still be positioned within the passage 26 above the valve seat 46. Since the shroud cylindrical outer wall 42 has a tolerance sliding clearance within the passage 26, this prevents the induction charge from entering the combustion chamber 20 until the lower edges of the ports move below the top of the valve seat. Then, as the valve continues to move downwardly, all the induction charge in passage 26 is divided or broken up and directed through the port means 48 in a plurality of jet-like flows for passage into the combustion chamber 20 to create a turbulent flow field therein. As the valve shroud is moved to its fully open position of FIG. 2, the ports 48 will continue to receive all the entering induction charge from passage 26, dividing the entire charge into eight jet-like flows directed radially outwardly into the combustion chamber 20.

Figure 4:
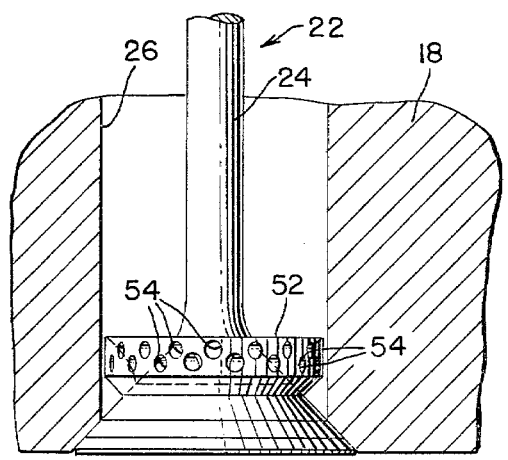
FIG. 4 is a view similar to FIG. 1 showing a modification of the shroud of the present invention.

A modified form of valve shroud 52 shown in FIG. 4, was tested for the purpose of establishing experimental parameters after the principles of the present invention were established. Shroud 52 is identical in all respects to shroud 34 except for the size and location of the ports.

In the shroud 52 of FIG. 4, circular ports 54 are provided, each of the ports having a port diameter of about 3 millimeters. The ports 54 are in the form of first or upper and second or lower rows of ports extending radially through the shroud. The port axes of the first rows of the ports are located in a first plane and the axes of each of the ports in the second row are located in a second plane. The first and second planes are parallel and are perpendicular to the longitudinal axis of the valve.

There are 16 ports in each row, and in each row the ports are spaced equally around the shroud so the angle between axes of adjacent ports is 22.5°. Furthermore the ports in the lower row are offset circumferentially relative to the ports in the upper row.

In FIG. 4, the edge-to-edge distance between the ports in one row is of the order of 1.56 millimeters while the edge-to-edge vertical distance between the rows is of the order of 0.35 millimeters.

It will be noted that for each of the two shrouds the total area of the ports is the same. FIGS. 1, 2 and 3 illustrate eight ports 48 each having a diameter of six millimeters and FIG. 4 illustrates 32 ports ports 54 each having a diameter of three millimeters. Thus the two shrouds each permit the same amount of air to enter the cylinder. Both shrouds have same volumetric efficiency.

Tests between the eight port version of the invention disclosed in FIGS. 1-3 and the 32-port version disclosed in FIG. 4 were conducted. The results showed that for any constant engine speed and with the same amount of air the intake valve shroud 34 with the eight larger ports 46 attained a higher burning velocity than the shroud 52 with the 32 ports. Also, the difference in maximum burning velocity between the two port arrangements became larger as the speed of the engine was increased. Thus, for example, the burning velocity in an engine operating at 1400 rpm revealed that the intake valve shroud 52 with the smaller ports 54 displayed only a marginal burning velocity increase as compared with an intake valve without any shroud. This is to be contrasted with the intake valve shroud 34 with the eight large ports 48 which attained a maximum burning velocity of about 25% higher than intake valves which did not employ the valve shroud.

Modifications and variations of the present invention are possible in the light of the above teachings. It is therefore to be understood that, for example, the terms upper and lower, horizontal and vertical, etc., as used in the specification have been employed merely for the purpose of description. For example, the shape of the ports may be rectangular, square, oval, etc., the total cross-sectional area of the ports may be changed, and the axis of the ports need not be on a radius of the shroud.

It will be understood that the various details of the valve shroud have been disclosed as only a preferred embodiment. Therefore, the foregoing explanation should be taken only as an illustration sense and not as restricted to scope of the present invention. The invention may be further developed within the spirit and scope of the following claims.

What is claimed is:

1. A valve shroud for an internal combustion engine intake valve having a cylinder block formed with a cylinder bore slidably receiving a piston therein, a cylinder head closing the bore and, together with the upper surface of the piston, defining combustion chamber means therebetween; an intake valve through which a combustible charge is introduced from induction passage means into the combustion chamber, the intake valve including a stem portion and a head portion interconnected by a face portion; the valve shroud comprising:

a collar having a generally cylindrical configuration;
    said collar having centrally located bore means defining an inner annular surface portion establishing sealing contact with the valve face portion;
    said collar centrally located bore means including a surface portion having a convex air foil cross-section taken through the axis of rotation of said collar;
    means securing said collar on the intake valve with said annular surface portion in sealing contact with said valve face portion;
    said collar having port means extending through said convex surface portion for providing communication between the induction passage means and the combustion chamber means during the opening of the intake valve and for increasing the efficiency of the charge flowing through said port means; and
    said collar characterized in that said port means have an axis generally perpendicular to said stem and said port means divide all of the entering charge from the induction passage means into a plurality of jet-like flows entering the combustion chamber means, such that turbulence of the charge is intensified providing rapid and complete combustion of the charge.

2. The valve shroud as defined in claim 1, wherein said port means in the form of a plurality of ports extending radially through said collar.

3. The valve shroud as defined in claim 1, wherein said port means is in the form of a plurality of circular ports extending through said collar with the ports arranged in a single row.

4. The valve shroud as defined in claim 3, wherein each of said circular ports has a diameter of the order of 6 millimeters.

5. The valve shroud as defined in claim 1, wherein said port means are arranged in a plurality of rows of ports extending through said collar.

6. The valve shroud as defined in claim 5, wherein the ports in one row of ports are circumferentially offset relative to the ports in the next adjacent rows of ports.

7. The valve shroud as defined in claim 5, wherein each port has a diameter of the order of 3 millimeters.

8. A valve shroud for an internal combustion engine intake valve of the type having a valve head and a valve stem for controlling the induction charge flow, the shroud comprising:

a 360° circular collar having centrally located bore means and including an annular surface portion adapted to conform with a face portion of the intake valve for establishing sealing contact of the collar with the intake valve face portion;
    said collar having port means extending therethrough, said port means having an axis generally perpendicular to the valve stem;
    said centrally located bore means being defined in part by a second surface portion having a convex air foil cross-section taken through the axis of rotation of said collar, said port means extending through said convex surface portion for increasing the efficiency of the induction charge flow; and
    said collar characterized in that said port means divide the induction charge into a plurality of jet-like flows providing controlled turbulence and swirl of the charge.

9. The valve shroud as defined in claim 8, wherein: said port means include a plurality of circular ports extending through said collar with the ports arranged in a single row.

10. The valve shroud as defined in claim 8, wherein: said port means include a plurality of uniformly spaced circular ports extending radially through said collar.

11. The valve shroud as defined in claim 8 wherein: said port means include eight circular ports equally spaced around said collar and extending radially therethrough.

12. The valve shroud as defined in claim 8 wherein: said centrally located bore means annular surface portion is defined as a frusto-conical surface adapted to conform with a face portion of the intake valve for establishing sealing contact therebetween.

13. The valve shroud as defined in claim 8 wherein: said bore means annular surface portion is in the form of a frusto-conical surface which converges toward said second surface portion.

14. The valve shroud as defined in claim 8 wherein said port means include a plurality of rows of ports extending radially through said collar.

15. The valve shroud as defined in claim 14 wherein: the ports in one row of ports are arranged in staggered relation to the ports in the next adjacent row of ports.

16. The valve shroud as defined in claim 14 wherein said port means include first and second rows of ports extending radially through said collar, with each of the ports being of the same diameter.

* * * * *